July 24, 1951          L. E. GURNEY          2,561,794
GREAT CIRCLE NAVIGATION INSTRUMENT
Filed Sept. 22, 1945          2 Sheets—Sheet 1
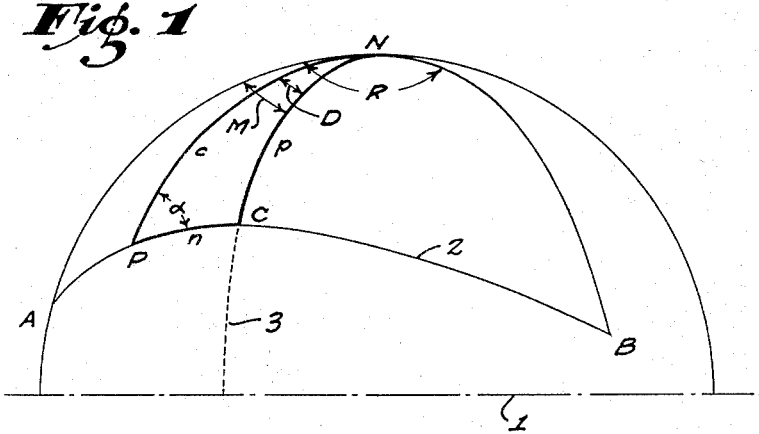
INVENTOR
*Lawrence E. Gurney*
BY *John Flann*
ATTORNEY July 24, 1951            L. E. GURNEY            2,561,794

GREAT CIRCLE NAVIGATION INSTRUMENT

Filed Sept. 22, 1945            2 Sheets-Sheet 2

INVENTOR
Lawrence E. Gurney
BY
ATTORNEY

Patented July 24, 1951

2,561,794

UNITED STATES PATENT OFFICE 2,561,794

GREAT CIRCLE NAVIGATION INSTRUMENT

Lawrence E. Gurney, Los Angeles, Calif.; Hazel T. Gurney administratrix of said Lawrence E. Gurney, deceased Application September 22, 1945, Serial No. 617,952

3 Claims. (Cl. 33—1)

This invention relates to navigation, and more particularly to navigation along a great circle route between points on the globe.

It is well understood that the most direct route between two points on the globe is one that follows a great circle. Should the points fall along a meridian, the great circle route can be navigated by sailing due north or due south. But, when the points are on separate meridians (corresponding to the difference in longitude), then the course must change in a continuous manner in order to maintain the ship on the great circle.

It is one of the objects of this invention to make it possible to ascertain at once whether a ship is following the great circle course, as well as to ascertain the required bearing for maintaining the ship on its course. In this manner, deviations of the ship from the desired course can be easily corrected.

It is another object of this invention to provide a simple instrument for ascertaining the required latitude, longitude, and bearing of the ship at every point of its great circle course.

It is still another object of this invention to make it possible readily to determine a new great circle course should the destination of the ship be altered, or should there be a material variation off course.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a diagram of great circle arcs and spherical triangles useful for explaining the invention;

Fig. 2 is a diagram of a plane figure further illustrating the application of the invention.

Figure 3:
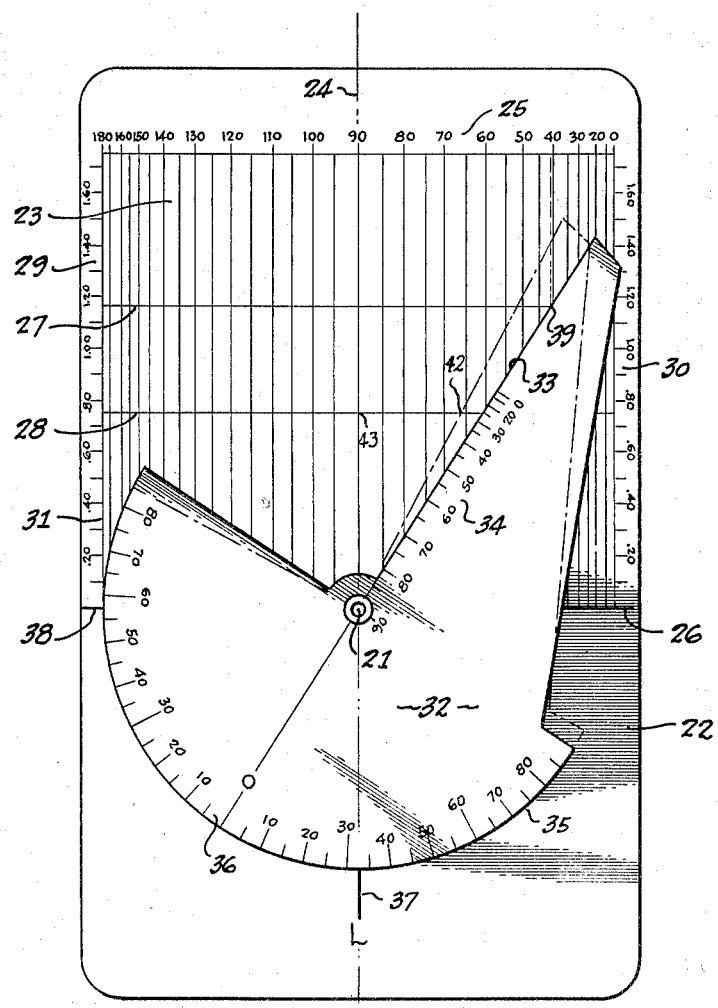
Fig. 3 is a plan view of an instrument incorporating the invention, some of the scale graduations being omitted so as to simplify the figure.

Fig. 1 represents, in orthographic projection, the great circle route 2 between the points A and B located on the sphere. Although the discussion will be quite general, in the present instance this great circle route is shown as comprised wholly in the northern hemisphere. It is assumed, of course, that the latitudes and longitudes of the places A and B are known. The equator is indicated by the straight line 1.

Given the longitudes and latitudes of these two places, it is possible to calculate for this particular route the angle represented by the arc $p$ between the pole N of the sphere and a point C, this point C being the intersection of the great circle route 2 and the great circle 3 which passes through the pole N, and is the normal to the great circle route 2. In other words, the arc $p$ divides the spherical triangle ANB into two spherical right triangles ACN and NCB. The great circle 3 corresponds to the meridian of the point C. The arc $p$ corresponds to the altitude of the spherical triangle ANB. Point C may also be designated as the crest of the great circle route 2.

Since the latitudes and longitudes of the places A and B are known, enough of the parts of the spherical triangle ANB are known to find any of its remaining parts. Thus, it can readily be proved, by an application of spherical trigonometry, that the following relation holds:

$$\tan p = \cos M \cdot \cot L_A \qquad (1)$$

where $p$ corresponds to the arc shown in Fig. 1; where M is the angle between the arcs AN and NC; and where $L_A$ is the latitude of the place A. The angle M is readily obtainable from the relationship $$\tan M = \cot L_A \cdot \tan L_B \csc R - \cot R \qquad (2)$$

where $L_B$ is the latitude of the place B, and the angle R is the angle between the sides AN and NB.

The value of the angle represented by the arc $p$ of course immediately determines the latitude of the point C, since $p$ plus $L_C$ equals 90°, $L_C$ being the latitude of the point C. The longitude is readily solvable by determination of the angle M by the aid of Formula 2 above, and by the further obvious relationship:

$$\lambda_C + M = \lambda_A, \text{ where } \lambda_C \text{ and } \lambda_A$$

are the longitudes, respectively, of places C and A.

Now, let it be assumed that it is desired to check the latitude and longitude of a ship, airplane, or other vehicle traveling between the places A and B on the great circle route 2. By appropriate astronomical observations, the latitude or longitude of the place where the ship is located is determined. By the aid of this invention it is possible very quickly to determine whether the ship is on the great circle course 2, or whether it is off that course, by determining the corresponding longitude or latitude of that point on the great circle which has the observed latitude or longitude.

For the purposes of discussion, the point P can be assumed as falling on the route 2, forming a spherical right triangle PNC. The angle between the sides $c$ and $p$ can be designated by D, and the angle between the sides $c$ and $n$ can be designated as $a$. The angle $a$ corresponds to the bearing of the ship at the point P if it is following the great circle course.

In the spherical triangle NPC, the side $p$ is known. Accordingly, the following relations exist:

$$\cos D = \tan p \cdot \cot C = \tan p \cdot \tan L \quad (3)$$

since L and $c$ are complementary; and $$\sin \alpha = \frac{\sin p}{\sin c} \quad (4)$$

If we assume the latitude L of the point P, then the side $c$ can be determined by the obvious relation:

$$c \text{ plus } L = 90°$$

Similarly, the angle D corresponds obviously to the difference in longitudes of the points P and C, for $\lambda \equiv \lambda$ $c$ plus D $\lambda$ being the longitude of the point P By the aid of Equation 3, assuming either the latitude or longitude of the point P, the longitude or latitude can consequently be computed. Similarly, by the aid of Equation 4, the bearing along the great circle route can be computed when the latitude of the point P is known.

By the aid of this invention, a simple graphic solution can be used in which the desired values are immediately read from appropriate scales. This graphic method can be readily explained by the aid of Fig. 2.

In this figure there are two mutually perpendicular lines 4 and 5. With their intersection 6 as a center, a unit circle 7 is drawn, corresponding to a great circle of the sphere.

Two lines 8 and 9 are drawn, parallel to the line 4 and spaced respectively by distances corresponding to sin $p$ and tan $p$. These lines intersect the perpendicular line 5 at points 17 and 41 respectively.

Let us assume the latitude of any point P to be represented by the arc 10—40 on this circle. The point 10 corresponds to the intersection of the unit circle 7 with line 5. Then, obviously, the angle L between radial lines 5 and 11 corresponds to the latitude L of the point P.

In order to obtain the longitude of point P, having the latitude L, the line 11 is extended until it intersects the line 9 at the point 12. Then a line 13 from point 12 is drawn perpendicular to the line 4, having its base at point 16 on line 4. This line 13 intersects the unit circle 7 at the point $\lambda_1$. The radius 15, drawn from the center 6 to the point $\lambda_1$, makes an angle D with line 4 that corresponds to the angle D of Fig. 1.

This can be readily deduced by the relationship of the plane right triangles of Fig. 2 and by the aid of Equation 3.

Thus, in Fig. 2, cos D is equal to the length of line 6—16. By construction, the length of line 6—41 is equal to tan $p$; and the length of line 12—41 (being equal to that of line 6—16 by construction) is thus equal to cos D. Therefore, by trigonometric functions, the tangent of angle L is the ratio of line 41—12 to line 6—41; that is, $$\tan L = \frac{\cos D}{\tan p}$$

This fulfills the requirements of Equation 3; and therefore D correctly represents the difference in longitude between points $c$ and $p$.

In order to obtain the angle $a$, corresponding to the bearing, use is made of another right triangle 6—17—18. In this right triangle, the hypotenuse 6—18 is made by construction equal to the length of the line 40—19 which is drawn from the point 40 perpendicular to the line 4. One leg 6—17 is equal to sin $p$ by construction. Accordingly, in order to construct the right triangle 6—17—18, an arc can be struck with the radius 6—18 equal to the length of the line 40—19. Then the intersection 18 with line 8 forms one of the acute angles of the right triangle 6—17—18.

In this right triangle, the angle $a$ of the bearing is truly represented by the angle between the lines 4 and 6—18, as well as between the line 6—18 and the side 17—18.

That this relationship holds can be readily verified by the aid of Equation 4.

Thus, sin $a$ in Fig. 2 is equal to the ratio of the length of line 6—17 to that of the line 6—18. But line 6—17 equals sin $p$ by construction; and the line 6—18 equals cos L or sin $c$. Therefore:

$$\sin \alpha = \frac{\sin p}{\sin c}$$

If the longitude of the point P be assumed, then the angle D can immediately be determined as aforesaid, for the line 15 can be drawn to correspond with this angle D. Then the latitude can be determined by drawing the line 13 perpendicular to line 4 through the point $\lambda_1$. Then, from the point 12 where line 13 intersects line 9, the line 11 can be drawn. In this way, the latitude L is graphically determined.

A simple instrument for determining these values is illustrated in Fig. 3. In this figure there are two scale-carrying members which are pivoted together at 21, on a center corresponding to the center 6 of Fig. 2.

One of the members 22 is shown as of generally rectangular configuration, and may be in the form of a paper chart 23 attached permanently or temporarily to a rigid type backing. There is a center line 24 perpendicular to a line 26 corresponding to the line 4 of Fig. 2. Adjacent the top edge of member 22 there is a series of graduations 25, corresponding to angles, the 90° point falling upon the line 24. These graduations correspond to a cosine scale; that is, from the center 24, measured along the horizontal line 26, the graduation lines 25 correspond to the cosines of the angles marked thereon. Many more graduations for scale 25 would be drawn in a practical embodiment to permit greater accuracy in reading the scale; but they are omitted in order to simplify the drawing. The scale extends from zero to 180°, corresponding to a diameter of a unit circuit such as 7 of Fig. 2.

There are also indicated two horizontal lines 27 and 28, corresponding to the lines 8 and 9 of Fig. 2. These lines are parallel to line 26 and are spaced therefrom respectively by the values tan $p$ and sine $p$; the scale for these values is, of course, consistent with the cosine values of scale 25. In other words, the distance from the 90° point on scale 25 to the zero point is taken as unity; for this distance corresponds to the cosine of zero. For each great circle course, the values of sin $p$ and tan $p$ can be calculated and placed on the chart 23. These trigonometric functions thus correspond to the position of crest C of the desired great circle route 2. To facilitate drawing these lines 27 and 28, scales 29 and 30 may be provided adjacent the edges of the chart. These scales can be drawn with more graduations, but they are omitted in order to simplify the drawing.

In lieu of such graduations, a number of different charts 23 could be prepared in advance for a number of different voyages, with lines 27, 28 printed thereon. Then the proper chart can be placed in position on the backing, and discarded at the end of the voyage preparatory for a new chart for the next voyage.

Since there are only a relatively few major ports on the globe, the charts to be printed are not too numerous.

The other member 32 is shown as in the form of an arm, provided with an edge 33 radial with the center 21, and preferably carrying graduations 34 marked in degrees and in such a way that cosines of angles correspond to distances from the center 21. Here, again, these graduations are consistent with scales 25, 29, and 30. Intermediate graduations are omitted to simplify the drawing.

Member 32 also carries the arcuate portion 35 marked in degrees, reading right and left from the central zero degree position which is aligned with edge 33. Finer graduations are again omitted for the sake of simplicity. Graduations 36 are intended to cooperate with the two indexes 37 and 38, placed at right angles to each other, and respectively along center line 24 and line 26.

The manner of use of the instrument may now be set forth.

If the latitude L of a point on the great circle course 2 (Fig. 1) be assumed, then the member 32 is turned about the center 21 until the index 37 coincides with the angle of latitude on the scale 36. The edge 33 then crosses the line 27 at the point 39. The angle D is then read on scale 25. For latitudes in the southern hemisphere, the left-hand part of scale 36 is utilized.

The relationship of this setting with the triangle 6—16—12 of Fig. 2 is apparent. The angle reading on scale 36 corresponds to the angle L of Fig. 2. The point 39 corresponds to point 12; and the distance from line 24 to point 39 corresponds to the cosine of angle D. This angle D, read from scale 25, can be utilized to obtain the longitude of the point P by simple addition; for angle D, as heretofore shown, is the difference in longitude of points P and C.

Conversely, the latitude can be obtained by a similar setting if the longitude be assumed. Knowing the longitude, the angle D can be obtained by simple subtraction. Then the member 32 is moved about its pivot until the edge 33 intersects line 27 at the proper scale line on scale 25, corresponding to the known angle D. The latitude can then be read off at index 37.

The bearing α can be obtained, if the latitude L is known, by a setting to correspond to the triangle 17—6—18 of Fig. 2. For this purpose, the scale 34 on member 32 is utilized. The member 32 is moved until the angle L, as measured on scale 34, intersects the line 28, as at point 42. Then the bearing can be read off the scale 36 at the point 38. This is apparent from the relationships set forth by Equation 4. The right triangle 21—43—42 corresponds to the right triangle 6—17—18 of Fig. 2. The angle at the apex 42, corresponding to the bearing α, is obviously indicated at the index 38, which indicates the departure of edge 33 from line 26.

The uses of the instrument are multiple. Great circle positions can be checked. If a navigator finds that the latitude and longitude observations check with the great circle requirements determined by the instrument, he knows he is on the course.

The sailing course is also determined by the aid of the instrument and corresponds to the angle α.

If the vessel or other craft is off course, it is possible easily to rechart a new great circle course by calculating tan p and sin p anew.

The form or chart 23 is a record of the voyage and can be kept as such if desired.

Since the point C (Fig. 1) corresponds to that point on the course having the greatest latitude, the calculations of longitude and latitude of this point gives the crest position of the route. Furthermore, the route can be used even for points beyond the two places A and B, since these two places represent merely two positions of the complete great circle, for any point of which the device may be used.

If desired, any number of corresponding longitudes and latitudes can be tabulated for the great circle route, and then the points plotted on any kind of plane map, such as a Mercator projection. A smooth curve through the plotted points gives the true great circle positions.

The inventor claims:

1. In an instrument for obtaining corresponding latitudes and longitudes of any position on a great circle route between two known places: a pair of members pivoted together on a center, one of said members having graduation lines corresponding to cosine values on each side of said center along a straight line through said center, representing a diameter of a unit circle, said cosine values being of angles from zero to one hundred eighty degrees, the center corresponding to ninety degrees, as well as one or more lines spaced from the said line representing a diameter by distances corresponding to the tangent function of the complement of the latitude of the crest of the great circle route; the other member having a straight edge radial of said center, the members being provided with a mutually coacting scale and index for indicating angular positions of the straight edge with respect to a line perpendicular to said line representing said diameter.

2. In an instrument for obtaining corresponding latitudes, longitudes, and bearings of any position on a great circle route between two known places: a pair of members pivoted together on a center; one of said members having graduation lines corresponding to cosine values on each side of said center along a line representing the diameter of a unit circle; said cosine values being of angles from zero to one hundred and eighty degrees; said one member also having graduation lines spaced from said diameter by distances corresponding to the sine and tangent of the angle between the pole of the earth and the crest of the great circle route; the other member having a cosine scale along a radius from the center; the members being provided with a mutually coacting scale and two indexes separated by ninety degrees for indicating the relative angular positions of the line representing the diameter and the cosine scale.

3. In an instrument of the character described for determining the bearing along any point of a great circle route between two known places: a pair of members pivoted together on a center; one of said members having a line parallel to a line passing through the center, and spaced therefrom by a distance corresponding to the sine of the angle between the pole of the earth and the crest of the great circle route; a cosine scale on the other member, the center corresponding to the cosine of ninety degrees, said cosine scale being along a radius from the center; the members being provided with a mutually coacting scale and index for indicating the relative angular positions of the cosine scale and the line through the center.

LAWRENCE E. GURNEY.

REFERENCES CITED

The following references are of record in the file of this patent:

UNITED STATES PATENTS

| Number | Name | Date |
|---|---|---|
| 679,662 | Almorth | July 30, 1901 |
| 811,625 | Edmonds | Feb. 6, 1906 |
| 1,955,392 | Shimberg | Apr. 17, 1934 |
| 2,302,210 | Graves | Nov. 17, 1942 |

FOREIGN PATENTS

| Number | Country | Date |
|---|---|---|
| 40,716 | Germany | Sept. 12, 1887 |